(12) United States Patent
Takahashi

(10) Patent No.: US 9,060,086 B2
(45) Date of Patent: Jun. 16, 2015

(54) IMAGE FORMING APPARATUS, IMAGE FORMING APPARATUS CONTROL METHOD, AND STORAGE MEDIUM

(75) Inventor: Toru Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 13/568,548

(22) Filed: Aug. 7, 2012

(65) Prior Publication Data

US 2013/0044339 A1 Feb. 21, 2013

(30) Foreign Application Priority Data

Aug. 17, 2011 (JP) ................................ 2011-178505

(51) Int. Cl.
*G06F 3/12* (2006.01)
*H04N 1/00* (2006.01)
*H04N 1/23* (2006.01)
*H04N 1/04* (2006.01)

(52) U.S. Cl.
CPC ........ *H04N 1/00578* (2013.01); *H04N 1/00588* (2013.01); *H04N 1/00591* (2013.01); *H04N 1/00602* (2013.01); *H04N 1/0061* (2013.01); *H04N 1/00615* (2013.01); *H04N 1/00623* (2013.01); *H04N 1/00631* (2013.01); *H04N 1/00708* (2013.01); *H04N 1/00745* (2013.01); *H04N 1/00774* (2013.01); *H04N 1/00801* (2013.01); *H04N 1/00816* (2013.01); *H04N 1/00822* (2013.01); *H04N 1/2323* (2013.01); *H04N 2201/0094* (2013.01)

(58) Field of Classification Search
CPC .......... H04N 1/00482; H04N 1/00708; H04N 1/0869; H04N 1/2323; H04N 1/33315; H04N 1/00681; H04N 2201/33314

USPC ............... 358/1.1, 1.9, 1.11, 1.12, 1.13, 1.14, 358/1.15, 1.16, 1.17, 1.18, 498
See application file for complete search history.

(56) References Cited

U.S. PATENT DOCUMENTS

| 2009/0096151 A1* | 4/2009 | Tokutsu | 271/3.14 |
| 2011/0013240 A1* | 1/2011 | Kobayashi | 358/498 |
| 2012/0120481 A1* | 5/2012 | Armstrong | 359/328 |

FOREIGN PATENT DOCUMENTS

| JP | 61124448 A | * | 6/1986 |
| JP | 6-291947 A | | 10/1994 |
| JP | 2001-013740 A | | 1/2001 |

* cited by examiner

*Primary Examiner* — Thierry L Pham
(74) *Attorney, Agent, or Firm* — Canon USA, Inc., IP Division

(57) ABSTRACT

An image forming apparatus includes a reading unit, a document conveyance unit, a sheet storage unit, a printing unit, a first and second determination unit, and a control unit. The reading unit reads a document. The printing unit performs printing on a sheet fed from the sheet storage unit. The first determination unit determines a first size of the document based on a size of a sheet stored in the sheet storage unit. The control unit causes the document conveyance unit to convey the document and causes the reading unit to read the document based on the determined first size. The second determination unit determines a second size of the conveyed document. In response to the determined first size not matching the determined second size, the control unit causes the document to be conveyed again and causes the document to be read again based on the determined second size.

18 Claims, 14 Drawing Sheets

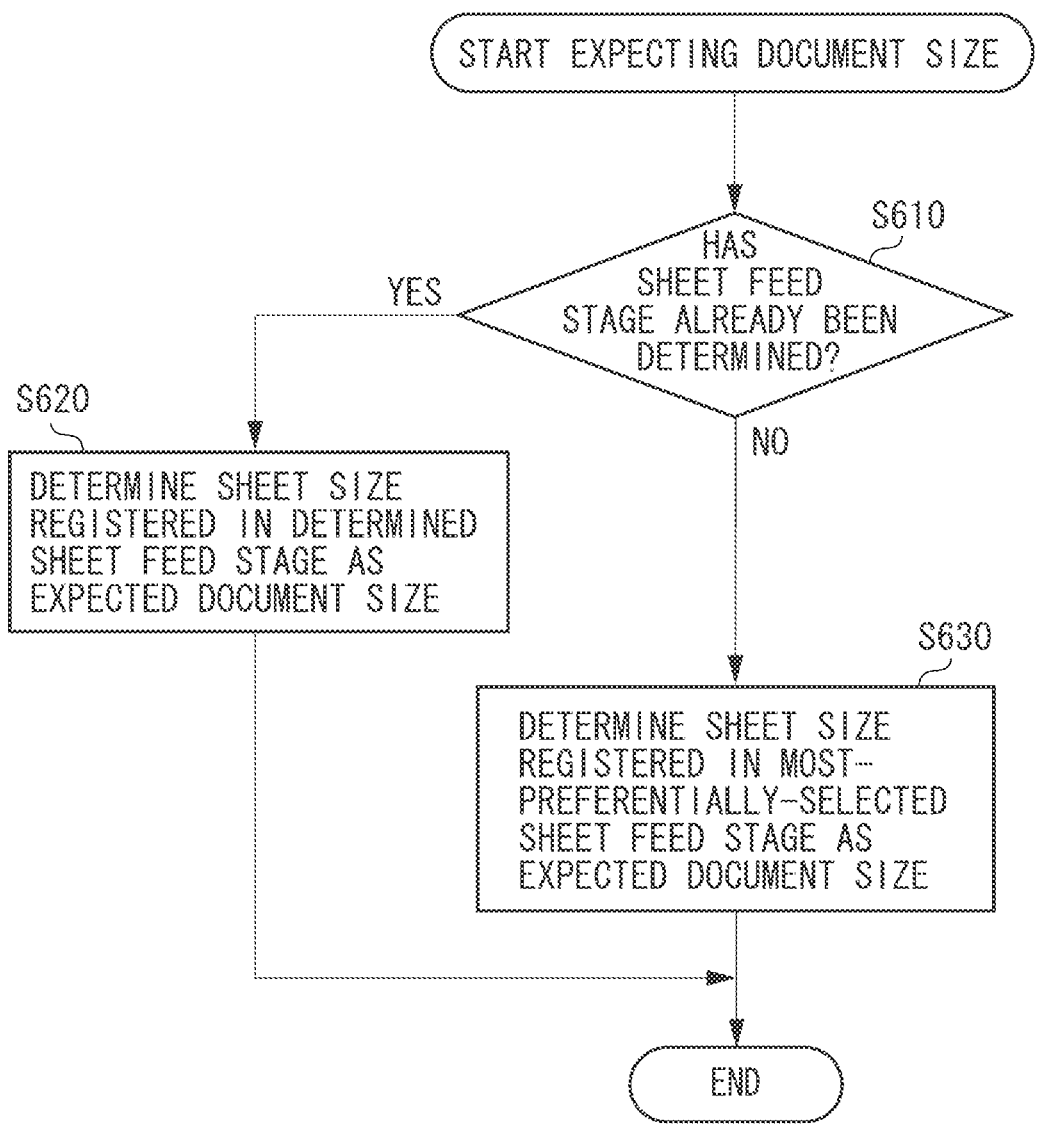

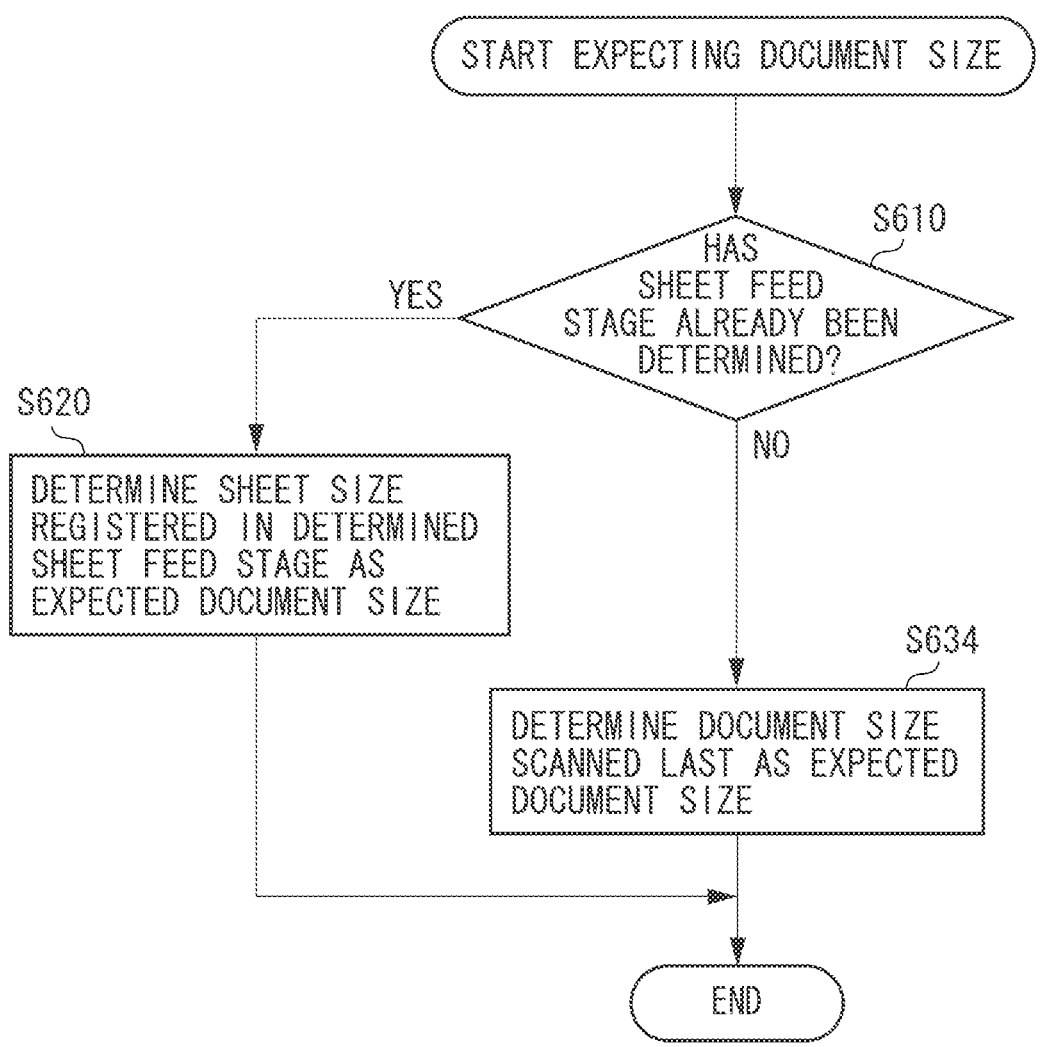

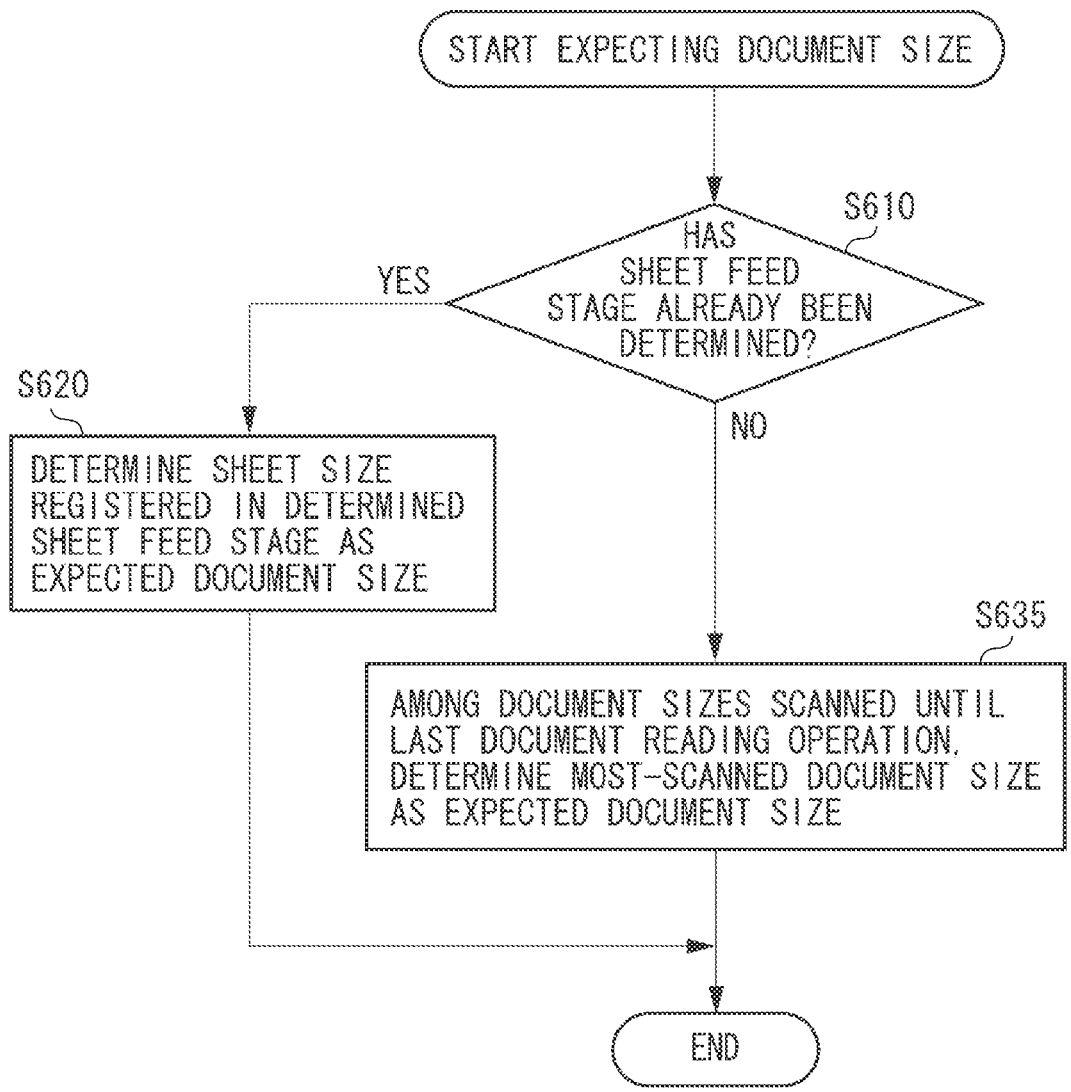

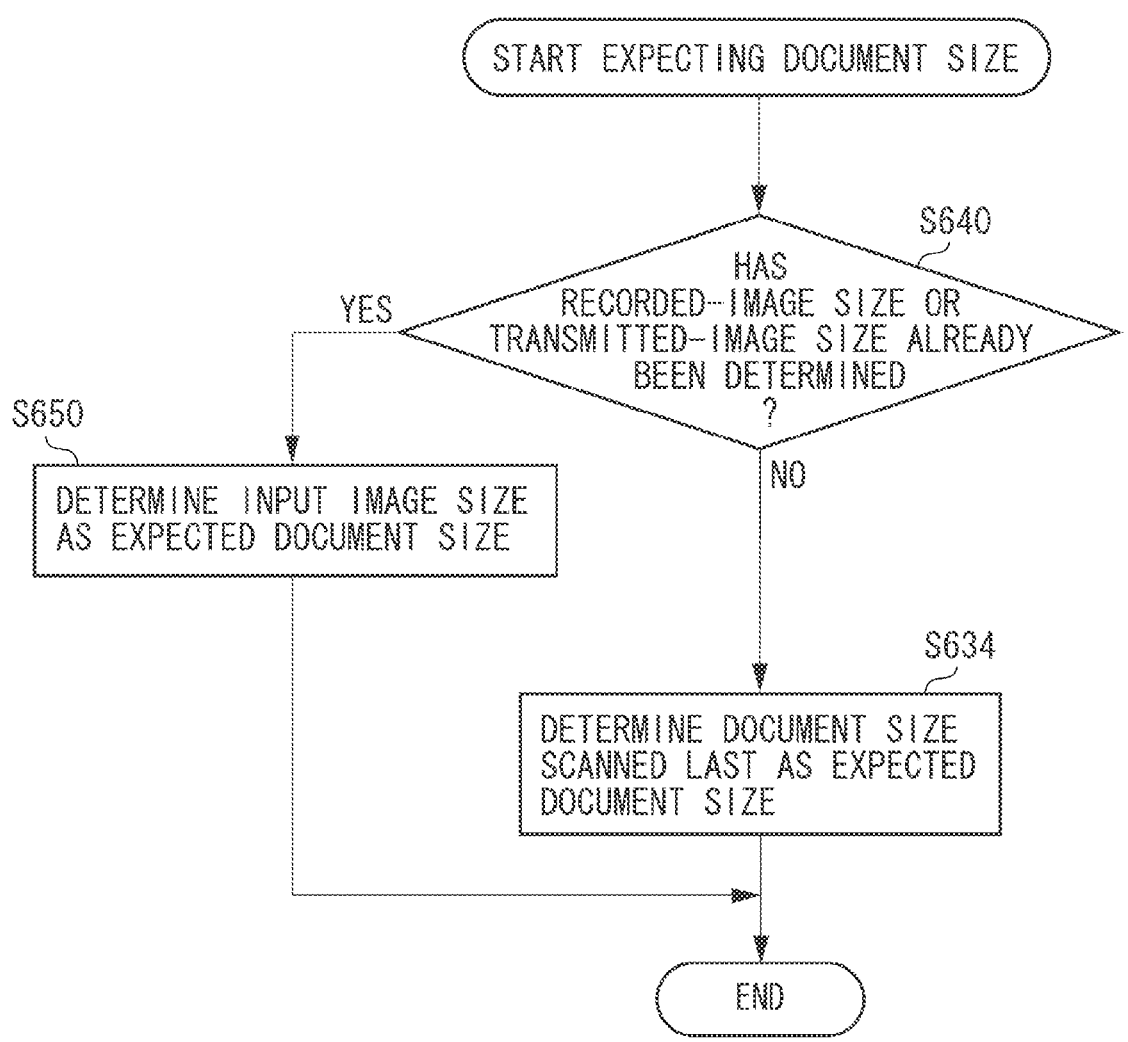

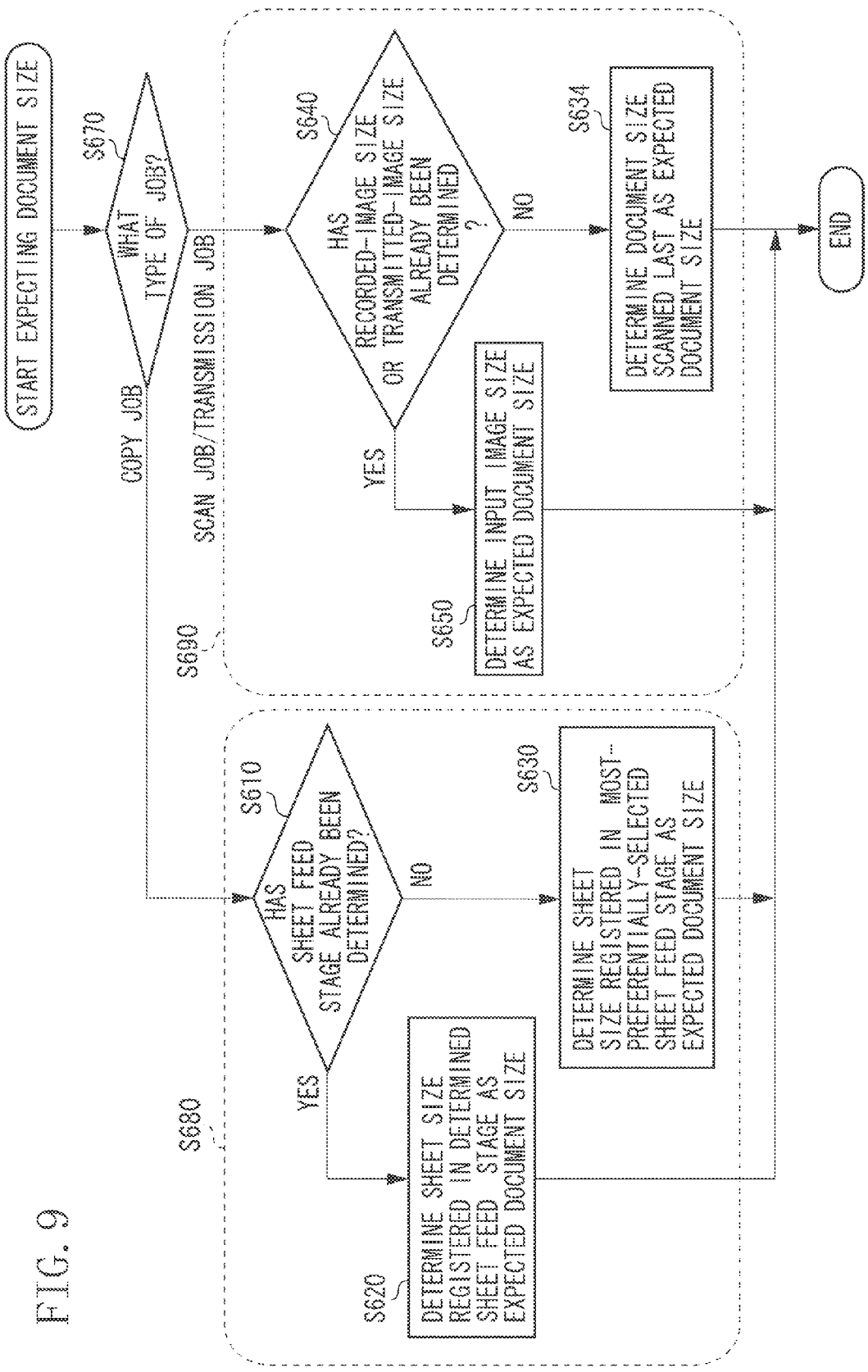

IMAGE FORMING APPARATUS, IMAGE FORMING APPARATUS CONTROL METHOD, AND STORAGE MEDIUM

BACKGROUND OF THE INVENTION

1. Field of the Invention

The present invention relates to a control operation for determining a document size.

2. Description of the Related Art

Conventionally, some image forming apparatuses such as digital multifunction peripherals include an auto document feeder (ADF) for automatically feeding documents placed on a sheet feed tray to a reading unit one by one.

FIG. 10 illustrates an ADF of a scanner unit 90 of an image forming apparatus.

The scanner unit 90 feeds documents 99 placed on a document tray 97 one by one, conveys a fed document 99 over a reading unit, and optically reads a document image.

When the scanner unit 90 reads documents in such a way, generally, the scanner unit 90 switches document-image reading sizes by using an optical mechanism. For example, the scanner unit 90 changes the speed at which the document 99 is conveyed over the reading unit, depending on the resolution or magnification. To determine the image reading size of a document, the scanner unit 90 needs to determine the size of the document before starting reading the document 99.

Japanese Patent Application Laid-Open No. 2001-13740 discusses an apparatus including a sensor for detecting the leading and trailing edges of a document along a document conveyance path. This apparatus uses the sensor to determine the length of the document in a sub-scanning direction (the direction illustrated by an arrow 92).

The apparatus discussed in Japanese Patent Application Laid-Open No. 2001-13740 also includes a sensor on a document tray, and this sensor determines the length of the document in a main-scanning direction (the direction illustrated by an arrow 91). Examples of such sensor include a sensor for detecting the width of a document stack guide 98 in FIG. 10.

Japanese Patent Application Laid-Open No. 6-291947 discusses an apparatus requiring a reduced number of sensors for determining the document size. This apparatus does not include a sensor for detecting the document size on a document tray. Instead, after the apparatus determines the length of a document in the sub-scanning direction by using a sensor for detecting the leading and trailing edges of the document, the apparatus uses the determined length to determine the length of the document in the main-scanning direction.

The apparatus discussed in Japanese Patent Application Laid-Open No. 6-291947 requires a reduced number of sensors. However, based on this apparatus, the leading and trailing edges of a conveyed document are detected by a sensor to determine the length of the document in the sub-scanning direction, and the document size is determined based on the determined length. Thus, the apparatus needs to convey the document for determining the document size.

SUMMARY OF THE INVENTION

The present invention is directed to a mechanism capable of reducing the number of sensors for determining a size of a document and capable of determining the size of the document without using the document.

According to an aspect of the present invention, an image forming apparatus includes a reading unit configured to read a document, a document conveyance unit configured to convey the document to the reading unit, a sheet storage unit configured to store a sheet, a printing unit configured to perform printing on a sheet fed from the sheet storage unit, a first determination unit configured to determine a size of the document based on a size of the sheet stored in the sheet storage unit, a control unit configured to cause the document conveyance unit to convey the document and to cause the reading unit to read the document based on the size determined by the first determination unit, and a second determination unit configured to determine the size of the document conveyed by the document conveyance unit, wherein, in response to the size determined by the first determination unit not matching the size determined by the second determination unit, the control unit causes the document conveyance unit to convey the document again and causes the reading unit to read the document again based on the size determined by the second determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B are flowcharts illustrating expected document size determination procedures according to the first exemplary embodiment and a second exemplary embodiment, respectively.

FIGS. 7A and 7B are flowcharts illustrating expected document size determination procedures according to fifth and sixth exemplary embodiments, respectively.

FIGS. 8A and 8B are flowcharts illustrating expected document size determination procedures according to seventh and eighth exemplary embodiments, respectively.

FIG. 9 is a flow chart illustrating an expected document size determination procedure according to a ninth exemplary embodiment.

BRIEF DESCRIPTION OF THE EMBODIMENTS

Various exemplary embodiments, features, and aspects of the invention will be described in detail below with reference to the drawings. In an example, an image forming apparatus determines a size of a document based on a print sheet size and controls a reading unit to read the document based on the determined size. If the actual document size differs from the determined size, the image forming apparatus controls the reading unit to re-read the document. If the reading unit re-reads the document, the image forming apparatus controls the reading unit to read the document based on the actual document size.

Figure 1:
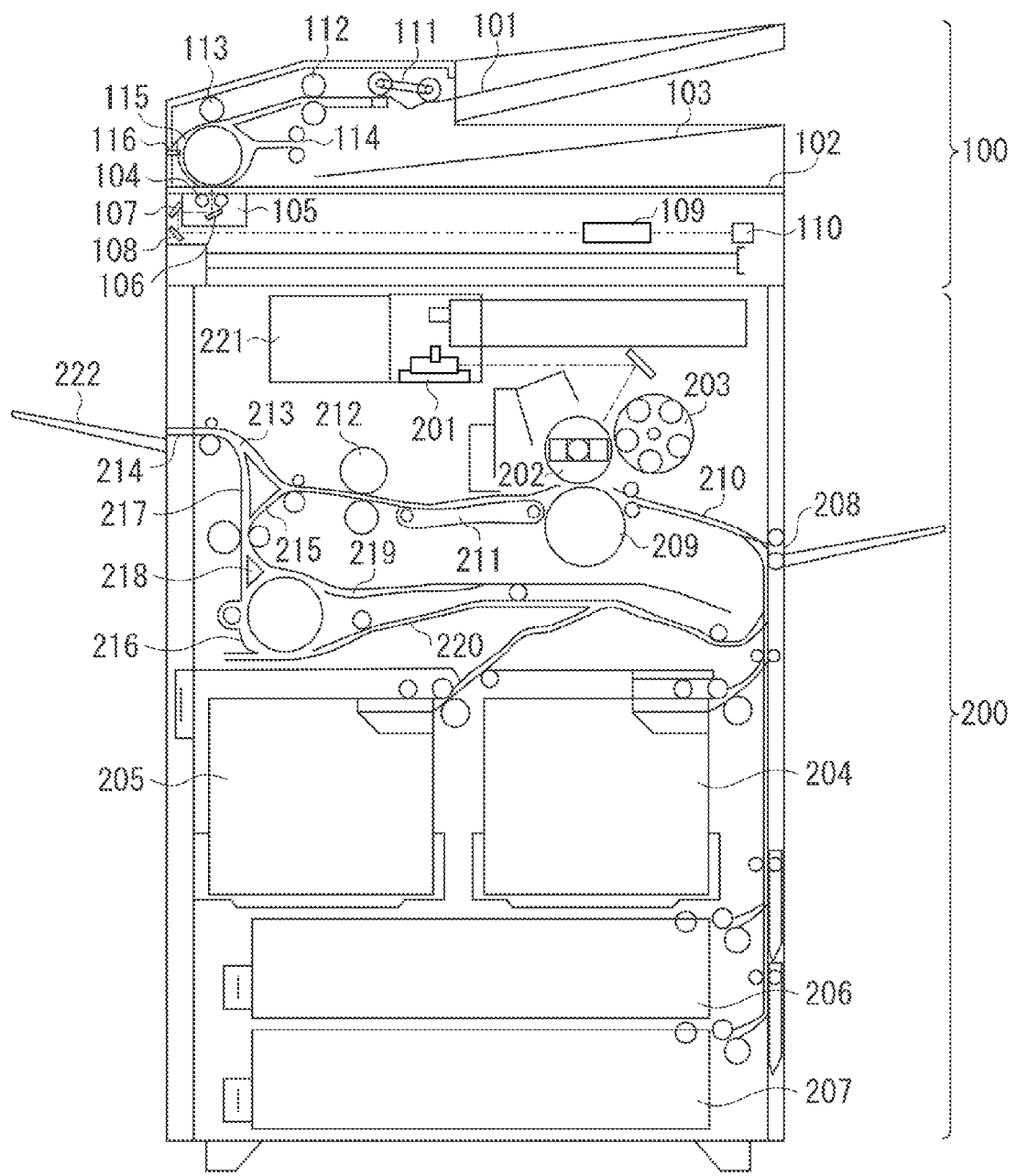
FIG. 1 is a cross section illustrating configurations of mechanisms in scanner and printer units of an image forming apparatus according to a first exemplary embodiment.

FIG. 1 is a cross section illustrating configurations of mechanisms in a scanner unit 100 and a printer unit 200 of an image forming apparatus according to a first exemplary embodiment.

Hereinafter, the scanner unit 100 and the printer unit 200 will be described in detail with reference to FIG. 1.

When reading documents placed on a document feed tray 101 of the scanner unit 100, the scanner unit 100 fixes an optical unit 105 at a predetermined position and turns on a lamp 104. Then, the scanner unit 100 feeds the documents on the document feed tray 101 one by one and moves each document over the optical unit 105. In this way, each document is exposed.

More specifically, first, a pick-up roller 111 captures a document on the document feed tray 101. Next, the captured document travels over the optical unit 105 via a first conveyance roller 112 and a second conveyance roller 113. Finally, the scanner unit 100 discharges the document to a discharge tray 103.

When the scanner unit 100 reads a two-sided document, after the document travels over the document optical unit 105, reversing rollers 114 convey the document along a reversing path. In this way, the sides of the read document are reversed, the second conveyance roller 113 conveys the document over the optical unit 105 again, and the optical unit 105 exposes the back side of the document. Then, the reversing rollers 114 convey the document along the reversing path again, and the scanner unit 100 discharges the document to the discharge tray 103.

In addition, when re-reading a document, the scanner unit 100 reverses the sides of the document twice in a way as described above, and conveys the document over the optical unit 105 via the second conveyance roller 113 to be re-read.

The above mechanisms 101, 111 to 115, and 103 form an ADF. Hereinafter, a document placed on the document feed tray 101 will be referred to as "a document placed on the ADF," for example.

The scanner unit 100 includes a sensor 116 along a document conveyance path 115, and this sensor 116 detects the leading and trailing edges of a conveyed document. By using this sensor 116, the image forming apparatus according to the first exemplary embodiment can determine the length of the conveyed document in the sub-scanning direction.

When reading a document set on a platen glass 102, the scanner unit 100 turns on the lamp 104 and moves the optical unit 105 to expose and scan the document.

When reading a document in any one of the above ways, reflected light, which is obtained when the document is exposed, is guided to a charge coupled device (CCD) image sensor 110 via mirrors 106 to 108 and a lens 109.

In this way, the CCD image sensor 110 reads an image of the scanned document. After image data output from the CCD image sensor 110 is subjected to predetermined processing, the image data is transferred to a controller unit 310 (in FIG. 2).

Next, a configuration and an operation of each of the mechanisms in the printer unit 200 will be described.

Figure 2:
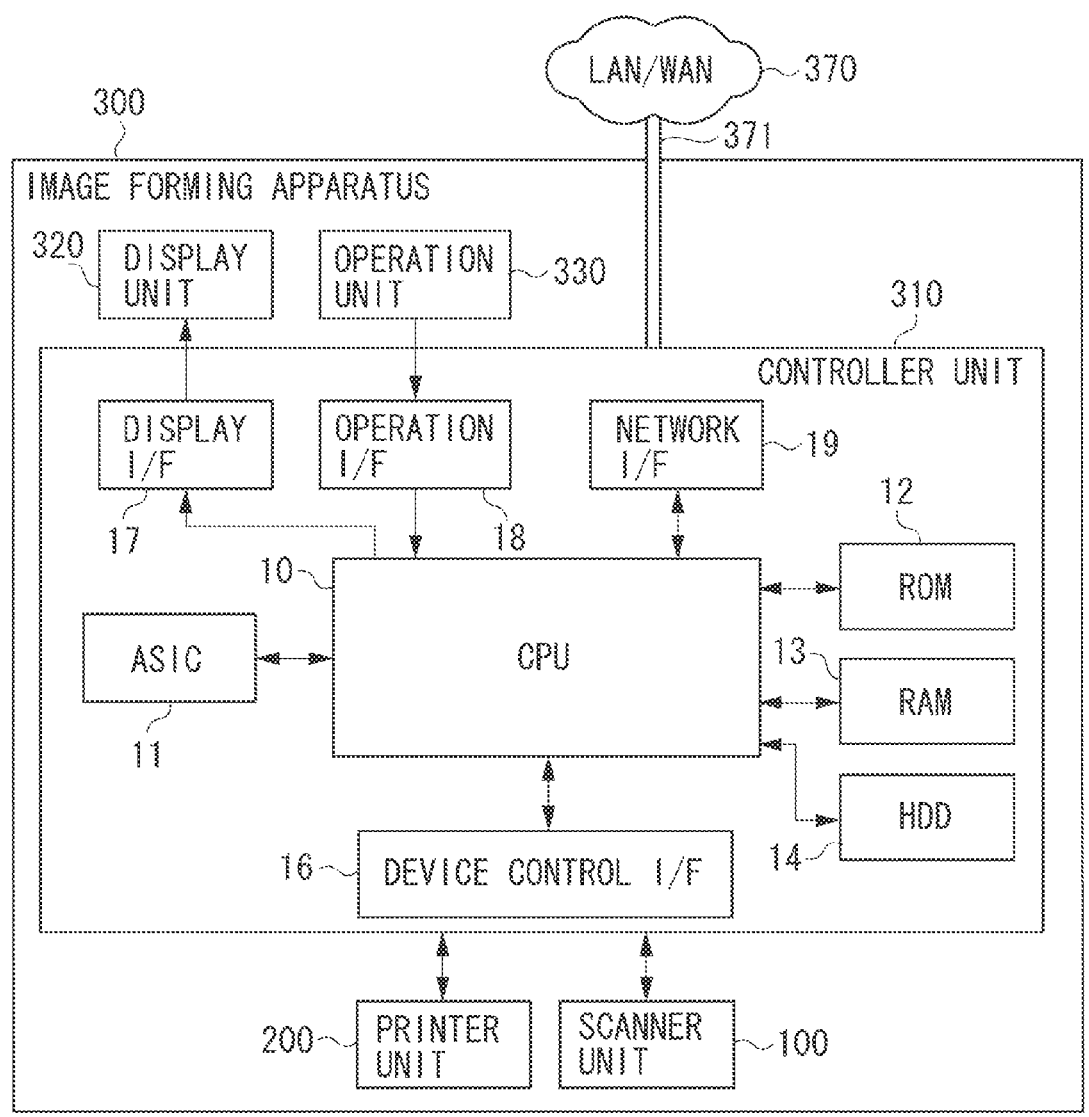
FIG. 2 illustrates a configuration of a hardware system of the image forming apparatus according to the first exemplary embodiment.

A laser driver 221 of the printer unit 200 drives and causes a laser emitting unit 201 to emit a laser beam based on the image data output from the controller unit 310 (in FIG. 2).

The laser emitting unit 201 illuminates a photosensitive drum 202 with the laser beam, and as a result, a latent image based on the laser beam is formed on the photosensitive drum 202. A developing unit 203 applies developer to the latent image formed on the photosensitive drum 202.

The printer unit 200 includes a plurality of sheet feed stages storing sheets, and the sheet feed stages include drawer-type cassettes 204 to 207 and a tray-type manual sheet feed stage 208 exposed to the outside of the printer unit 200. Examples of the sheets include plain paper, thick paper, and overhead transparency (OHT) sheets. Hereinafter, print sheets are used as the sheets.

Except in the case of the manual sheet feed stage 208, when supplying print sheets, a user draws a cassette, stores print sheets in the cassette, and closes the cassette. In addition, each of the cassettes 204 to 207 and the manual sheet feed stage 208 has a sensor for detecting the size and the number of the stored print sheets.

First, in synchronization with start of the laser beam illumination, the printer unit 200 feeds a print sheet from one of the cassettes 204 to 207 and the manual sheet feed stage 208 to a transfer unit 209 along a conveyance path 210. The transfer unit 209 transfers the developer applied to the photosensitive drum 202 to the print sheet.

Next, a conveyance belt 211 conveys the print sheet, to which the developer has been transferred, to a fixing unit 212, and the fixing unit 212 uses heat and pressure to fix the developer on the print sheet. Then, after traveling through the fixing unit 212, the print sheet is discharged via conveyance paths 213 and 214.

When reversing the print side of the print sheet before discharging the print sheet, the printer unit 200 conveys the print sheet along conveyance paths 215 and 216, conveys the print sheet in the reverse direction, and discharges the print sheet along a conveyance path 217 and the conveyance path 214. Finally, the print sheet discharged along the conveyance path 214 is stacked on a discharge bin 222.

When the printer unit 200 executes two-sided printing, after the print sheet travels through the fixing unit 212, a flapper 218 guides the print sheet from the conveyance path 215 to a conveyance path 219. Next, the print sheet travels in the reverse direction, and the flapper 218 guides the print sheet to the conveyance path 216 and a re-feed conveyance path 220. After guided to the re-feed conveyance path 220, the print sheet travels along the conveyance path 210 at the above timing and proceeds to the transfer unit 209.

FIG. 2 illustrates a configuration of a hardware system of an image forming apparatus 300 according to the first exemplary embodiment. Mechanisms identical between FIGS. 1 and 2 are denoted by the same numerals.

In FIG. 2, the image forming apparatus 300 according to the first exemplary embodiment includes the controller unit 310, a display unit 320, an operation unit 330, the printer unit 200, and the scanner unit 100.

The display unit 320 includes a light-emitting diode (LED) or a liquid crystal display to display operation contents for an operator and an internal status of the apparatus. The operation unit 330 receives operations from the operator. The operation unit 330 may include a plurality of operation buttons and work with the display unit 320 to serve as a touch display.

As illustrated in FIG. 1, the scanner unit 100 reads a document as image data, and the printer unit 200 prints the image data on a print medium. The scanner unit 100 does not automatically detect the lengths of a document placed on the ADF in the main- and sub-scanning directions, without feeding the document.

The controller unit 310 includes a central processing unit (CPU) 10, an application specific integrated circuit (ASIC) 11, a read-only memory (ROM) 12, a random access memory (RAM) 13, a hard disk drive (HDD) 14, a device control interface (I/F) 16, a display I/F 17, an operation I/F 18, and a network I/F 19.

The CPU 10 is a medium that executes a control program included in the image forming apparatus 300 and controls operations of devices connected to the controller unit 310 via various I/Fs, storage medium memories, exclusive chips, and the like.

The ASIC 11 is a chip for specific application and executes specific processing such as image processing separately from the CPU 10. The ROM 12, the RAM 13, and the HDD 14 are storage media, which are a non-volatile memory, a volatile memory, and a magnetic disk, respectively. The ROM 12 or the HDD 14 stores a control program executed by the CPU 10, and the control program is rasterized in the RAM 13 when executed.

In addition, the RAM 13 operates as a work memory when the CPU 10 executes a control program. The RAM 13 stores print jobs and image data to be printed, for example. The HDD 14 also stores print jobs, image data to be printed, for example.

In FIG. 2, the controller unit 310 includes one CPU 10, ASIC 11, ROM 12, RAM 13, and HDD 14. However, alternatively, the controller unit 310 may include a plurality of CPUs 10, ASICs 11, ROMs 12, RAMs 13, and HDDs 14. In addition, configuration and connection modes of these components are not limited to those of the present exemplary embodiment.

The device control I/F 16 controls data input/output to/from devices (the printer unit 200 and the scanner unit 100) connected to the controller unit 310 and exchanges information such as device control instructions and device status notifications with the devices. The device control I/F 16 has a bus structure to which a plurality of devices can be connected. In addition, the device control I/F 16 can be divided into a plurality of I/Fs, so that each of the I/Fs can be connected to a device on a one-on-one basis.

The display I/F 17 controls data output to the display unit 320, the operation I/F 18 controls data input from the operation unit 330, and the network I/F 19 controls data input/output from/to a network 370.

The image forming apparatus 300 includes the network I/F 19 as an external I/F. The image forming apparatus 300 is connected to the Internet or a local area network/wide area network (LAN/WAN) 370 as an intranet through a network cable 371 via the network I/F 19 (in reality, the image forming apparatus 300 is connected to a hub or a server/client of the LAN/WAN 370).

Figure 3:
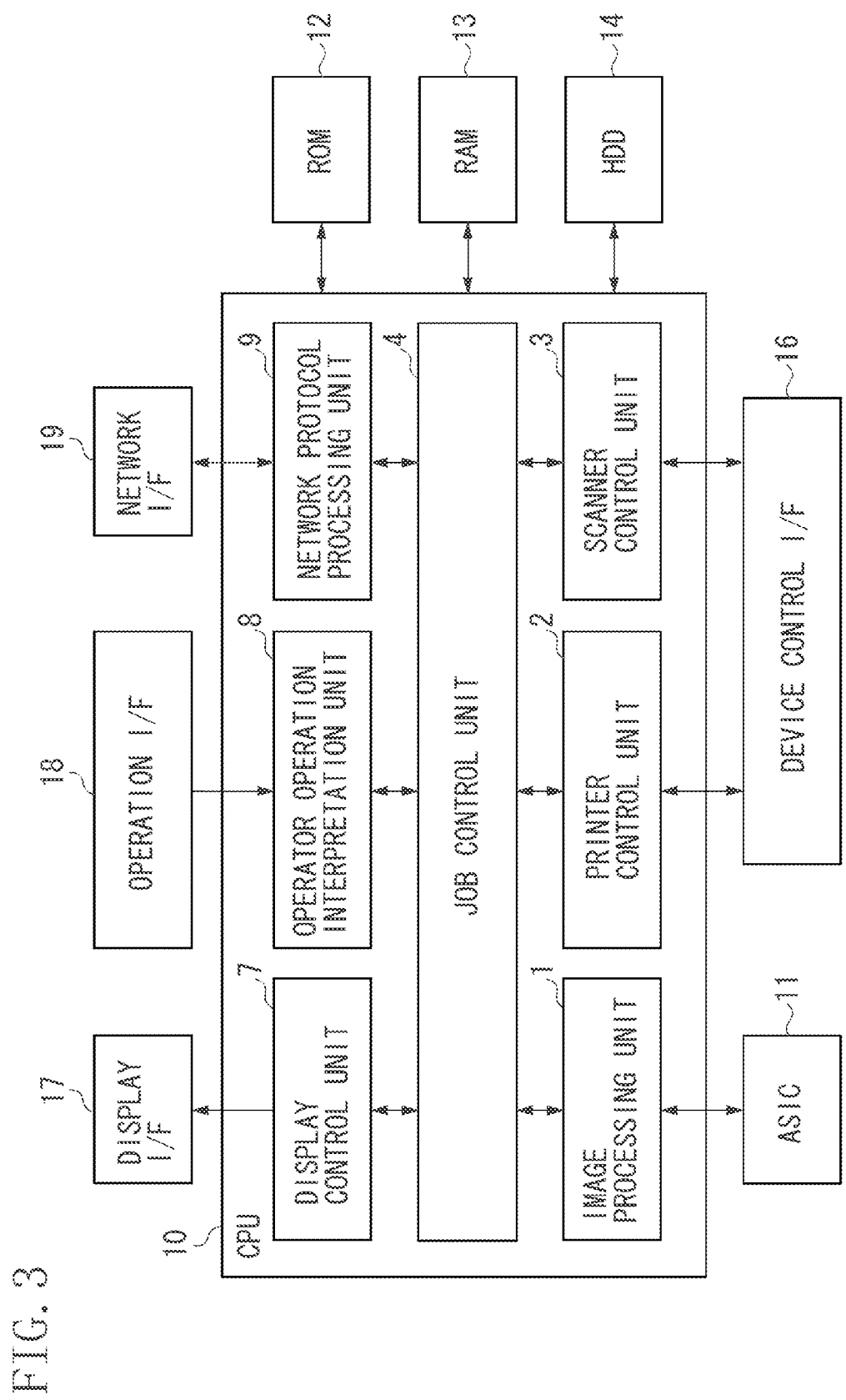
FIG. 3 is a block diagram illustrating a configuration of a control program included in the image forming apparatus according to the first exemplary embodiment.

FIG. 3 is a block diagram illustrating a configuration of a control program included in the image forming apparatus 300 according to the first exemplary embodiment. Mechanisms identical between FIGS. 2 and 3 are denoted by the same numerals.

At least one of the storage media (the ROM 12, the RAM 13, and the HDD 14) stores the control program included in the image forming apparatus 300 according to the first exemplary embodiment. The CPU 10 executes the control program while using these storage media.

The present control program is configured by a display control unit 7, an operator operation interpretation unit 8, a network protocol processing unit 9, a job control unit 4, an image processing unit 1, a printer control unit 2, and a scanner control unit 3. Namely, the display control unit 7, the operator operation interpretation unit 8, the network protocol processing unit 9, the job control unit 4, the image processing unit 1, the printer control unit 2, and the scanner control unit 3 are functional units realized when the CPU 10 executes the computer-readable program stored in the recording medium.

The display control unit 7 receives information about a job, an apparatus status, etc. from the job control unit 4 and transmits a command for reflecting the information on a display screen to the display I/F 17. The operator operation interpretation unit 8 receives operation commands from the operation I/F 18 and gives various instructions, such as the start, halt, restart, or end of a job, to the job control unit 4.

The network protocol processing unit 9 processes standard network protocols including Transmission Control Protocol/Internet Protocol (TCP/IP) to transmit and receive data via the network I/F 19.

The image processing unit 1 receives image data of a document read by the scanner unit 100. If the image data is Page Description Language (PDL) data, the image processing unit 1 rasterizes the data and generates an image. In addition, the image processing unit 1 executes image processing such as expansion, compression, or rotation of an image, by controlling data transmission/reception timings or parameter settings with respect to the ASIC 11.

The printer control unit 2 controls the printer unit 200 via the device control I/F 16, so that the printer unit 200 can print image data on a paper medium. In addition, the printer control unit 2 acquires information about the print sheets registered in the sheet feed stages included in the printer unit 200 and information about the remaining print sheets set in the sheet feed stages.

The scanner control unit 3 controls the scanner unit 100 via the device control I/F 16, so that the scanner unit 100 can read a document as image data.

To read a document placed on the ADF, the scanner control unit 3 controls the scanner unit 100 to feed the document, read a document image, and detect the length of the document in the sub-scanning direction. One of the storage media (the ROM 12, the RAM 13, and the HDD 14) previously stores a table for determining a certain document size based on the length of the document in the sub-scanning direction. The scanner control unit 3 uses the detected length of the document in the sub-scanning direction and the table, to determine a document size.

In addition, while the scanner control unit 3 determines whether to re-read the document, the determination method will be described below. If the scanner control unit 3 determines that the scanner unit 100 needs to re-read the document, the scanner control unit 3 performs control to discard the image data of the read document, reverse the fed document twice, and re-read the document image.

The job control unit 4 receives data as a job from the operation unit 330 or an external apparatus. The job control unit 4 executes this job by controlling operations of various devices based on contents of the job.

For example, if the job control unit 4 receives a copy job, the job control unit 4 controls the scanner control unit 3, the image processing unit 1, and the printer control unit 2 to execute the respective copy operations, and controls the display control unit 7 to display a job execution status.

In another example, if the job control unit 4 receives a scan job, the job control unit 4 controls the scanner control unit 3 and the image processing unit 1 to store the generated image data in the HDD 14.

In another example, if the job control unit 4 receives a transmission job, the job control unit 4 controls the scanner control unit 3 and the image processing unit 1 to generate image data and controls the network protocol processing unit 9 to transmit the image data to an external apparatus.

Next, a job control procedure executed by the job control unit 4 and the scanner control unit 3 according to the first exemplary embodiment will be described.

Figure 4:
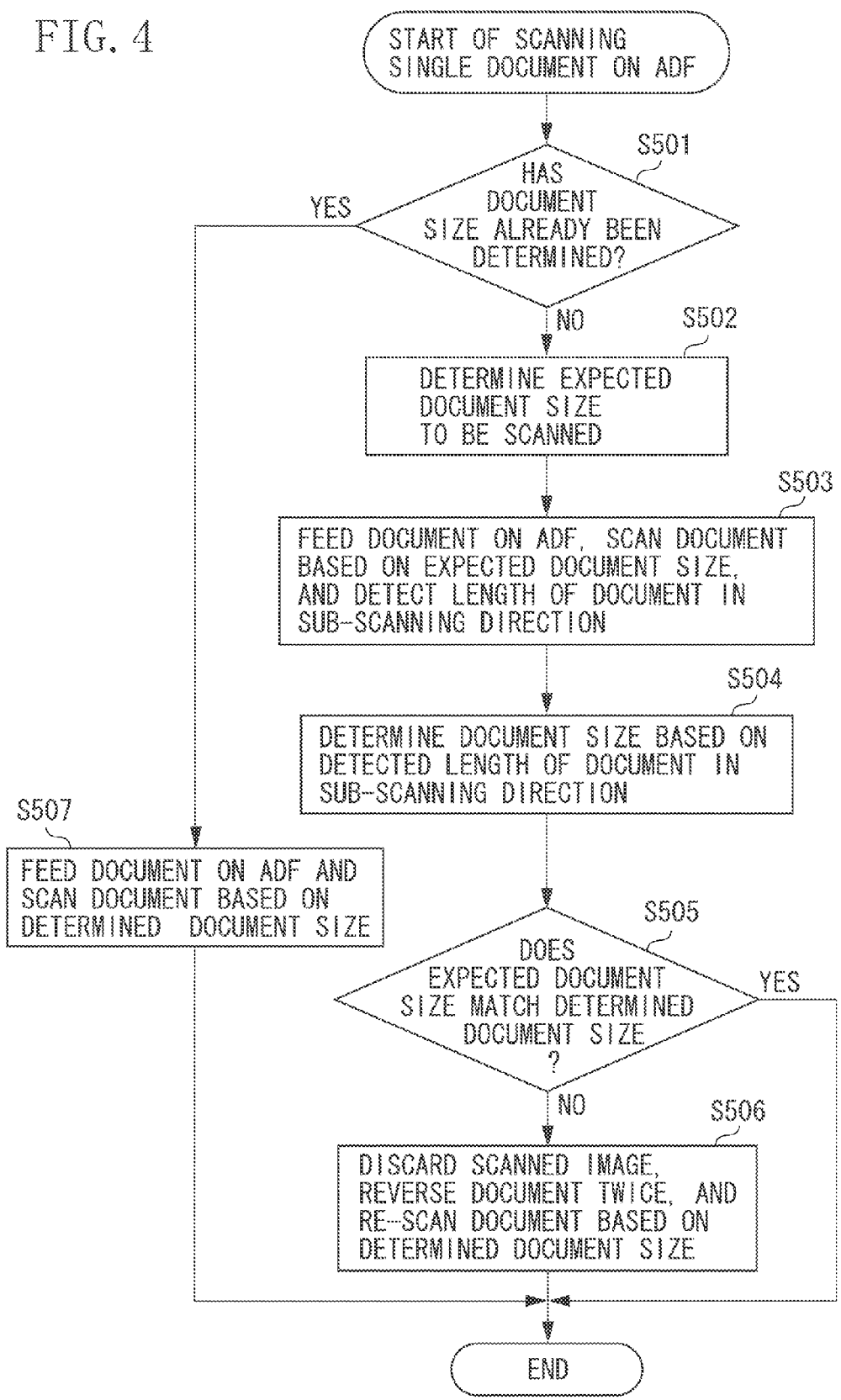
FIG. 4 is a flow chart illustrating a control procedure for reading documents placed on an ADF one by one according to the first exemplary embodiment.

FIG. 4 is a flow chart illustrating a control procedure for reading documents placed on the ADF one by one. This flow chart is executed by the job control unit 4, the scanner control unit 3, and the like. Namely, the CPU 10 executes this flow chart by executing a computer-readable program stored in a recording medium.

To read an image of a single document placed on the ADF, first, in step S501, the job control unit 4 determines whether the size of the document placed on the ADF has already been determined.

In this step S501, for example, the display control unit 7 displays a document size input (instruction) screen on the display unit 320. In step S501, if the user inputs a predetermined document size via the operation unit 330 and the job control unit 4 receives a job start instruction (YES in step S501), the job control unit 4 determines that the document size has already been determined.

Namely, in step S501, if the user inputs a document size and the job control unit 4 receives a job start instruction including the document size (YES in step S501), the job control unit 4 determines that the size of the document has already been determined. However, in step S501, if the user does not input a document size and the job control unit 4 receives a job start instruction (NO in step S501), the job control unit 4 determines that the document size has not been determined.

In step S501, if the job control unit 4 determines that the size of the document placed on the ADF has already been determined (YES in step S501), the processing proceeds to step S507. In step S507, the scanner control unit 3 controls the ADF to feed a single document on the ADF and to scan the document based on the determined document size input via the operation unit 330, and generates image data of the document. Next, the processing ends.

On the other hand, in step S501, if the job control unit 4 determines that the size of the document placed on the ADF has not been determined (NO in step S501), the processing proceeds to step S502.

In step S502, the job control unit 4 determines an expected size of the document to be read on the ADF. In step S502, the job control unit 4 determines an expected document size, without feeding the document on the ADF. Various expected document size determination methods will be described with reference to FIGS. 5A to 9.

In step S503, the scanner control unit 3 controls the ADF to feed a single document on the ADF, starts reading the document based on the expected document size, and detects the length of the fed document in the sub-scanning direction. The length of this fed document in the sub-scanning direction is detected by the sensor 116 and the scanner control unit 3. More specifically, the sensor 116 detects the leading and trailing edges of the fed document, and the scanner control unit 3 calculates, based on the detection results, the length of the document in the sub-scanning direction.

In step S504, the scanner control unit 3 determines a standard document size based on the length of the document in the sub-scanning direction detected in step S503.

In step S505, the scanner control unit 3 determines whether the expected document size determined in step S502 matches the document size determined in step S504.

In step S505, if the scanner control unit 3 determines that the expected document size determined in step S502 matches the document size determined in step S504 (YES in step S505), the scanner control unit 3 generates image data of the read document. Then, the processing ends.

However, in step S505, if the scanner control unit 3 determines that the expected document size determined in step S502 does not match the document size determined in step S504 (NO in step S505), the processing proceeds to step S506.

In step S506, the scanner control unit 3 discards the image data of the read document and controls the ADF to reverse the document twice, re-feed the document, and execute a scan control operation based on the document size determined in step S504 (re-reading processing). Then, the processing ends.

If the ADF does not have a mechanism for reversing the document twice, the user may set the document on the ADF again. In this case, the scanner control unit 3 discards the image data of the read document, and the display control unit 7 causes the display unit 320 to display a message instructing the user to set the document on the ADF. After the user sets the document on the ADF again, the scanner control unit 3 controls the ADF to re-feed the document.

An expected document size determination procedure executed in step S502 in FIG. 4 will be described in detail with reference to a flow chart in FIG. 5A.

FIG. 5A is a flow chart illustrating an expected document size determination procedure according to the first exemplary embodiment. The job control unit 4 executes this flow chart. More specifically, the CPU 10 executes this flow chart by executing a computer-readable program stored in a recording medium.

First, in step S610, the job control unit 4 determines whether a sheet feed stage for feeding a print medium (print sheet) has already been determined.

For example, when a copy job is executed, the job control unit 4 displays a screen on the display unit 320. This screen indicates sheet feed stages including one in which print sheets desired by the user are set. If the user inputs a predetermined sheet feed stage via the operation unit 330 and the job control unit 4 receives a copy start instruction, the job control unit 4 determines that a sheet feed stage has already been determined (YES in step S610).

When the scanner unit 100 scans a plurality of documents placed on the ADF, the scanner unit 100 may determine the subsequent document size based on a document size determined in the first reading operation, that is, based on auto paper select (APS) and auto stage select (ASS) functions. Namely, if the sheet feed stage after the second reading operation is determined, in step S610, the job control unit 4 determines that a sheet feed stage has already been determined.

However, in step S610, if the user inputs no predetermined sheet feed stage and the job control unit 4 receives a copy start instruction in the first reading operation, the job control unit 4 determines that no sheet feed stage has been determined (NO in step S610).

In step S610, if the job control unit 4 determines that a sheet feed stage is determined (YES in step S610), the processing proceeds to step S620. In step S620, the job control unit 4 acquires information about the print sheets registered in the determined sheet feed stage from the printer control unit 2 and uses the sheet size indicated by the print sheet information as an expected document size. Next, the processing proceeds to step S503 of the flow chart in FIG. 4.

However, in step S610, if the job control unit 4 determines that no sheet feed stage has been determined (NO in step S610), the processing proceeds to step S630.

In step S630, among all the sheet feed stages used by the ASS function, the job control unit 4 determines a most-preferentially-selected sheet feed stage as a sheet feed stage to be used. The job control unit 4 acquires information about the print sheets registered in the determined sheet feed stage from the printer control unit 2 and uses the sheet size indicated by the print sheet information as an expected document size. Then, the processing proceeds to step S503 of the flow chart in FIG. 4.

As described above, before feeding a document, the image forming apparatus 300 according to the first exemplary embodiment determines an expected size of the document based on the size of the sheets set in a sheet feed stage of the printer unit 200. In addition, the image forming apparatus 300 determines the size of the conveyed document while scanning the document. If the determined document size does not match the expected document size determined in advance, the image forming apparatus 300 re-scans the document based on the determined document size.

In particular, according to the first exemplary embodiment, among the sheet feed stages used by the ASS function, the image forming apparatus 300 uses a sheet size registered (set) in a most-preferentially-selected sheet feed stage as an expected document size.

Based on this configuration according to the first exemplary embodiment, the image forming apparatus 300 requires a reduced number of sensors for determining a document size and can determine a document size before reading a document image (before feeding a document).

An expected document size determination procedure according to a second exemplary embodiment executed in step S502 in FIG. 4 will be described in detail with reference to a flow chart in FIG. 5B.

Figure 5B:
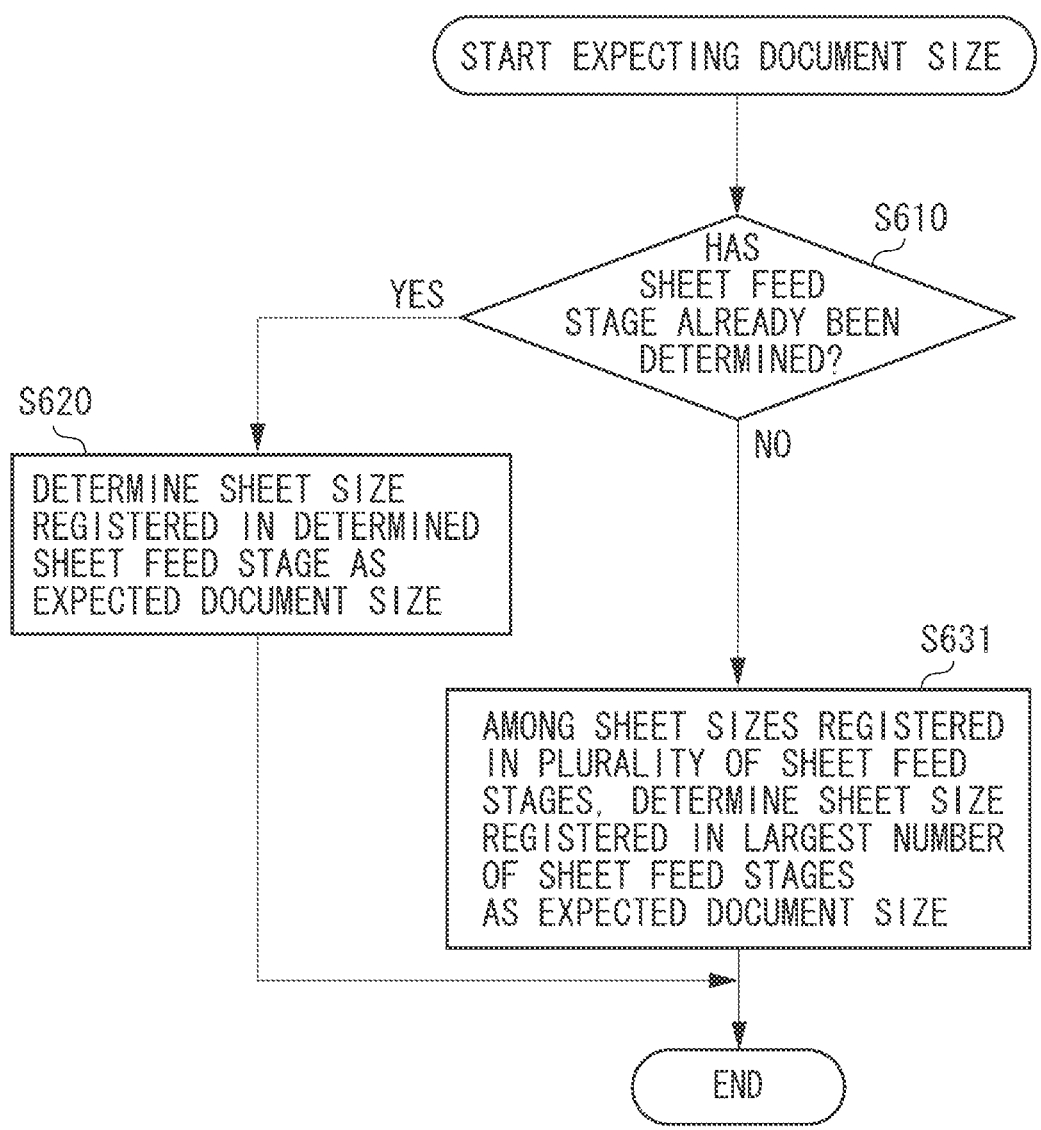

FIG. 5B is a flow chart illustrating an expected document size determination procedure according to the second exemplary embodiment. The job control unit 4 executes this flow chart. More specifically, the CPU 10 executes this flow chart by executing a computer-readable program stored in a recording medium.

Since steps S610 and S620 in FIG. 5B are the same as those in FIG. 5A, the redundant description thereof will be omitted.

In step S610 in FIG. 5B, if the job control unit 4 determines that no sheet feed stage has been determined (NO in step S610), the processing proceeds to step S631.

In step S631, the job control unit 4 acquires information about the print sheets registered in all the sheet feed stages included in the printer unit 200 from the printer control unit 2. Based on the acquired information, the job control unit 4 determines the sheet size registered in the largest number of sheet feed stages as an expected document size. Then, the processing proceeds to step S503 of the flow chart in FIG. 4.

Thus, according to the second exemplary embodiment, among the sizes of the sheets in a plurality of sheet feed stages, since the job control unit 4 determines the size of the sheets registered (set) in the largest number of sheet feed stages as an expected document size, the image forming apparatus 300 requires a reduced number of sensors for determining a document size and can determine a document size before reading a document image (before feeding a document).

An expected document size determination procedure according to a third exemplary embodiment executed in step S502 in FIG. 4 will be described in detail with reference to a flow chart in FIG. 6A.

Figure 6A:
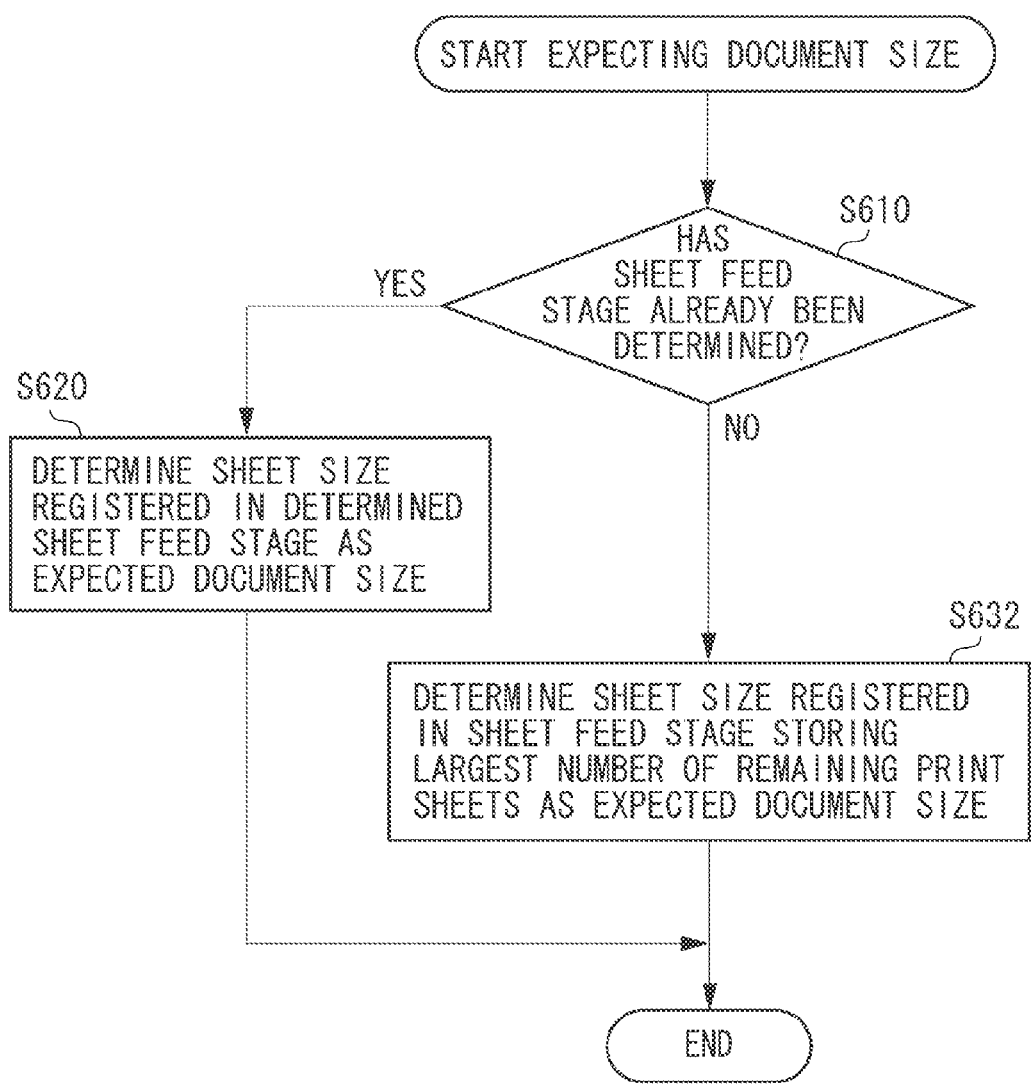
FIGS. 6A and 6B are flowcharts illustrating expected document size determination procedures according to third and fourth exemplary embodiments, respectively.

FIG. 6A is a flow chart illustrating an expected document size determination procedure according to the third exemplary embodiment. The job control unit 4 executes this flow chart. More specifically, the CPU 10 executes this flow chart by executing a computer-readable program stored in a recording medium.

Since steps S610 and S620 in FIG. 6A are the same as those in FIG. 5A, the redundant description thereof will be omitted.

In step S610 in FIG. 6A, if the job control unit 4 determines that no sheet feed stage has been determined (NO in step S610), the processing proceeds to step S632.

In step S632, the job control unit 4 acquires information about the print sheets registered in all the sheet feed stages included in the printer unit 200 and information about the remaining print sheets set in all the sheet feed stages from the printer control unit 2. Based on the acquired information, the job control unit 4 determines the size of the sheets registered in a sheet feed stage storing the largest number of remaining print sheets as an expected document size. Then, the processing proceeds to step S503 of the flow chart in FIG. 4.

Thus, according to the third exemplary embodiment, among a plurality of sheet feed stages, since the job control unit 4 determines the size of the sheets registered (set) in a sheet feed stage storing the largest number of remaining print sheets as an expected document size, the image forming apparatus 300 requires a reduced number of sensors for determining a document size and can determine a document size before reading a document image (before feeding a document).

An expected document size determination procedure according to a fourth exemplary embodiment executed in step S502 in FIG. 4 will be described in detail with reference to a flow chart in FIG. 6B.

Figure 6B:
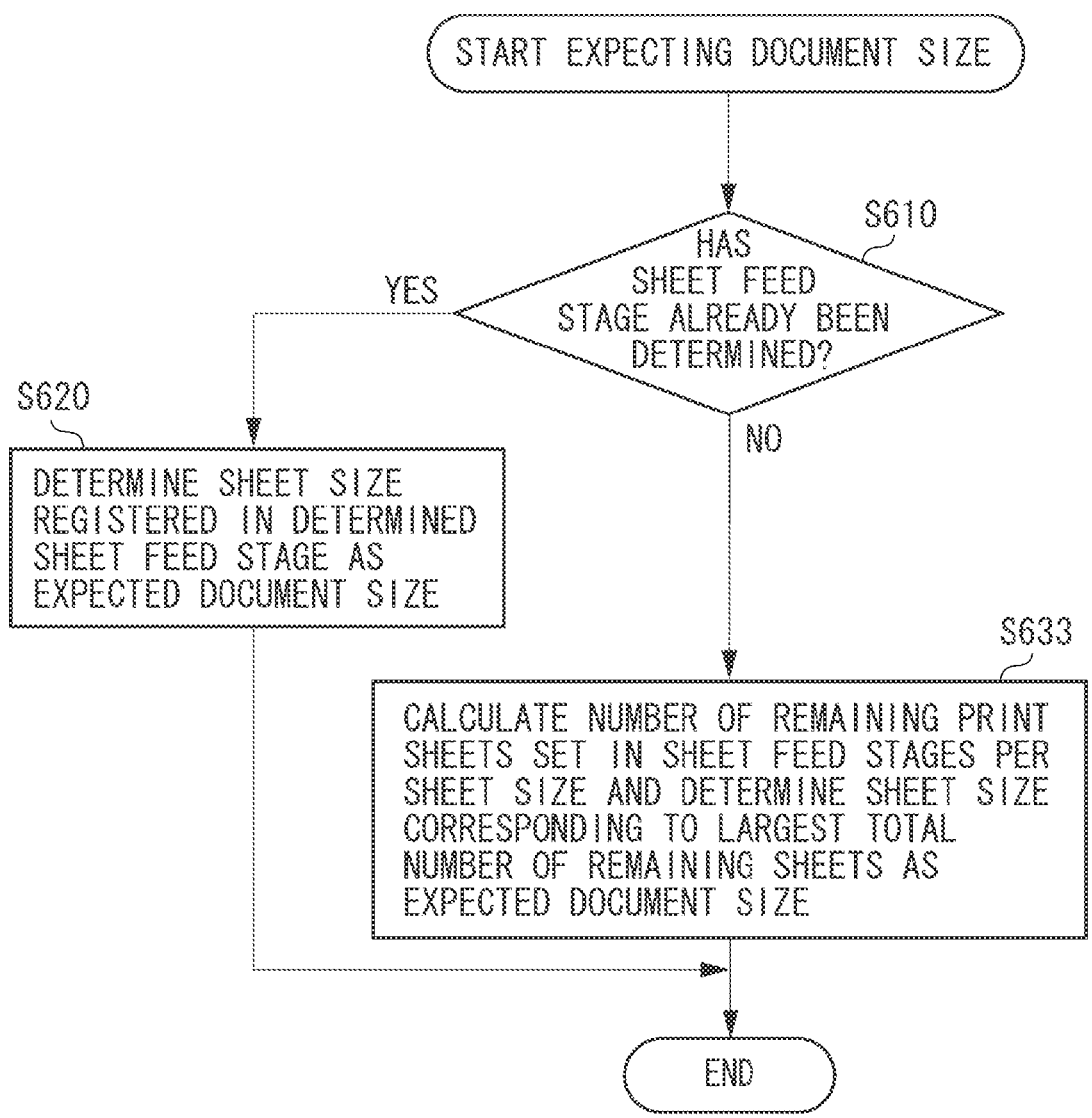

FIG. 6B is a flow chart illustrating an expected document size determination procedure according to the fourth exemplary embodiment. The job control unit 4 executes this flow chart. More specifically, the CPU 10 executes this flow chart by executing a computer-readable program stored in a recording medium.

Since steps S610 and S620 in FIG. 6B are the same as those in FIG. 5A, the redundant description thereof will be omitted.

In step S610 in FIG. 6B, if the job control unit 4 determines that no sheet feed stage has been determined (NO in step S610), the processing proceeds to step S633.

In step S633, the job control unit 4 acquires information about the print sheets registered in all the sheet feed stages included in the printer unit 200 from the printer control unit 2. The job control unit 4 calculates the number of remaining print sheets set in the sheet feed stages per sheet size, and based on the calculated numbers, the job control unit 4 determines the sheet size corresponding to the largest number of remaining sheets as an expected document size. Namely, among the sizes stored in a plurality of sheet feed stages, the job control unit 4 determines the sheet size corresponding to the largest total number of remaining sheets as an expected document size. Then, the processing proceeds to step S503 of the flow chart in FIG. 4.

Thus, according to the fourth exemplary embodiment, among a plurality of sheet feed stages, since the job control unit 4 determines the sheet size corresponding to the largest total number of remaining sheets as an expected document size, the image forming apparatus 300 requires a reduced number of sensors for determining a document size and can determine a document size before reading a document image (before feeding a document).

An expected document size determination procedure according to a fifth exemplary embodiment in step S502 in FIG. 4 will be described in detail with reference to a flow chart in FIG. 7A.

FIG. 7A is a flow chart illustrating an expected document size determination procedure according to the fifth exemplary embodiment. The job control unit 4 executes this flow chart.

More specifically, the CPU 10 executes this flow chart by executing a computer-readable program stored in a recording medium.

Since steps S610 and S620 in FIG. 7A are the same as those in FIG. 5A, the redundant description thereof will be omitted.

In step S610 in FIG. 7A, if the job control unit 4 determines that no sheet feed stage has not been determined (NO in step S610), the processing proceeds to step S634.

In step S634, the job control unit 4 determines a document size used in the last document reading operation as an expected document size. Then, the processing proceeds to step S503 of the flow chart in FIG. 4.

The job control unit 4 stores information about the document size finally used in the last scanning operation in a storage medium (the RAM 13 or the HDD 14). Namely, the job control unit 4 stores a document size, which is determined in step S504 in FIG. 4 in the last scanning operation, in the storage medium. In step S634, the job control unit 4 acquires the information about the finally-stored document size from the storage medium and determines an expected document size.

Alternatively, the job control unit 4 may store the document image size finally read by the scanner unit 100 in the last scanning operation in the storage medium and determines an expected document size based on the document image size finally stored in the storage medium.

Thus, according to the fifth exemplary embodiment, since the job control unit 4 determines the sheet size used in the last document reading operation as an expected document size, the image forming apparatus 300 requires a reduced number of sensors for determining a document size and can determine a document size before reading a document image (before feeding a document).

An expected document size determination procedure according to a sixth exemplary embodiment executed in step S502 in FIG. 4 will be described in detail with reference to a flow chart in FIG. 7B.

FIG. 7B is a flow chart illustrating an expected document size determination procedure according to the sixth exemplary embodiment. The job control unit 4 executes this flow chart. More specifically, the CPU 10 executes this flow chart by executing a computer-readable program stored in a recording medium.

Since steps S610 and S620 in FIG. 7B are the same as those in FIG. 5A, the redundant description thereof will be omitted.

In step S610 in FIG. 7B, if the job control unit 4 determines that no sheet feed stage has been determined (NO in step S610), the processing proceeds to step S635.

In step S635, the job control unit 4 acquires the document sizes read and accumulated until the last document reading operation, and based on the accumulated document sizes, the job control unit 4 determines a most-read document size as an expected document size. Then, the processing proceeds to step S503 of the flow chart in FIG. 4.

According to this procedure illustrated in FIG. 7B, the job control unit 4 accumulates information about the document sizes used until the last scanning operation in a storage medium (the RAM 13 or the HDD 14). Namely, the job control unit 4 accumulates the document sizes, which are determined in step S504 in FIG. 4 until the last scanning operation, in a storage medium. In step S635, the job control unit 4 acquires the information about the accumulated document sizes from the storage medium and determines an expected document size.

Alternatively, the job control unit 4 may accumulate the document image sizes read by the scanner unit 100 until the last scanning operation in the storage medium, acquire information about the accumulated document image sizes from the storage medium, and determine an expected document size based on the most-read document image size in such information.

Thus, according to the sixth exemplary embodiment, since the job control unit 4 determines the most-read document size based on the document reading operations until the last reading operation as an expected document size, the image forming apparatus 300 requires a reduced number of sensors for determining a document size and can determine a document size before reading a document image (before feeding a document).

An expected document size determination procedure according to a seventh exemplary embodiment executed in step S502 in FIG. 4 will be described in detail with reference to a flow chart in FIG. 8A.

FIG. 8A is a flow chart illustrating an expected document size determination procedure according to the seventh exemplary embodiment. The job control unit 4 executes this flow chart. More specifically, the CPU 10 executes this flow chart by executing a computer-readable program stored in a recording medium.

In step S640, the job control unit 4 determines whether a recorded-image size or a transmitted-image size has already been determined.

For example, when executing a scan job, the job control unit 4 displays a screen on the display unit 320 for the user to input a desired recorded-image size. For example, when executing a transmission job, the job control unit 4 displays a screen on the display unit 320 for the user to input a desired transmitted-image size.

If the user inputs a predetermined recorded-image size or transmitted-image size on such screen via the operation unit 330 and if the job control unit 4 receives a job start instruction, the job control unit 4 determines that a recorded-image size or a transmitted-image size has already been determined (YES in step S640).

In addition, in step S640, when scanning a plurality of documents placed on the ADF, the job control unit 4 also determines that the recorded-image size of the second and subsequent sheets has already been determined.

In contrast, if the user does not input a predetermined recorded-image size or transmitted-image size, the job control unit 4 receives a job start instruction, and the scanner unit 100 reads the first sheet, the job control unit 4 determines that no recorded-image size or transmitted-image size has been determined.

If the job control unit 4 determines that a recorded-image size or transmitted-image size has already been determined (YES in step S640), the processing proceeds to step S650.

In step S650, the job control unit 4 determines the input image size (recorded-image size or transmitted-image size) as an expected sheet size. Then, the processing proceeds to step S503 of the flow chart in FIG. 4.

If the job control unit 4 determines that no recorded-image size or transmitted-image size has been determined (NO in step S640), the processing proceeds to step S634.

In step S634, the job control unit 4 determines a document size read in the last document reading operation as an expected document size. Then, the processing proceeds to step S503 of the flow chart in FIG. 4.

Step S634 in FIG. 8A is the same as that in FIG. 7A.

An expected document size determination procedure according to an eighth exemplary embodiment executed in step S502 in FIG. 4 will be described in detail with reference to a flow chart in FIG. 8B.

Figure 8B:
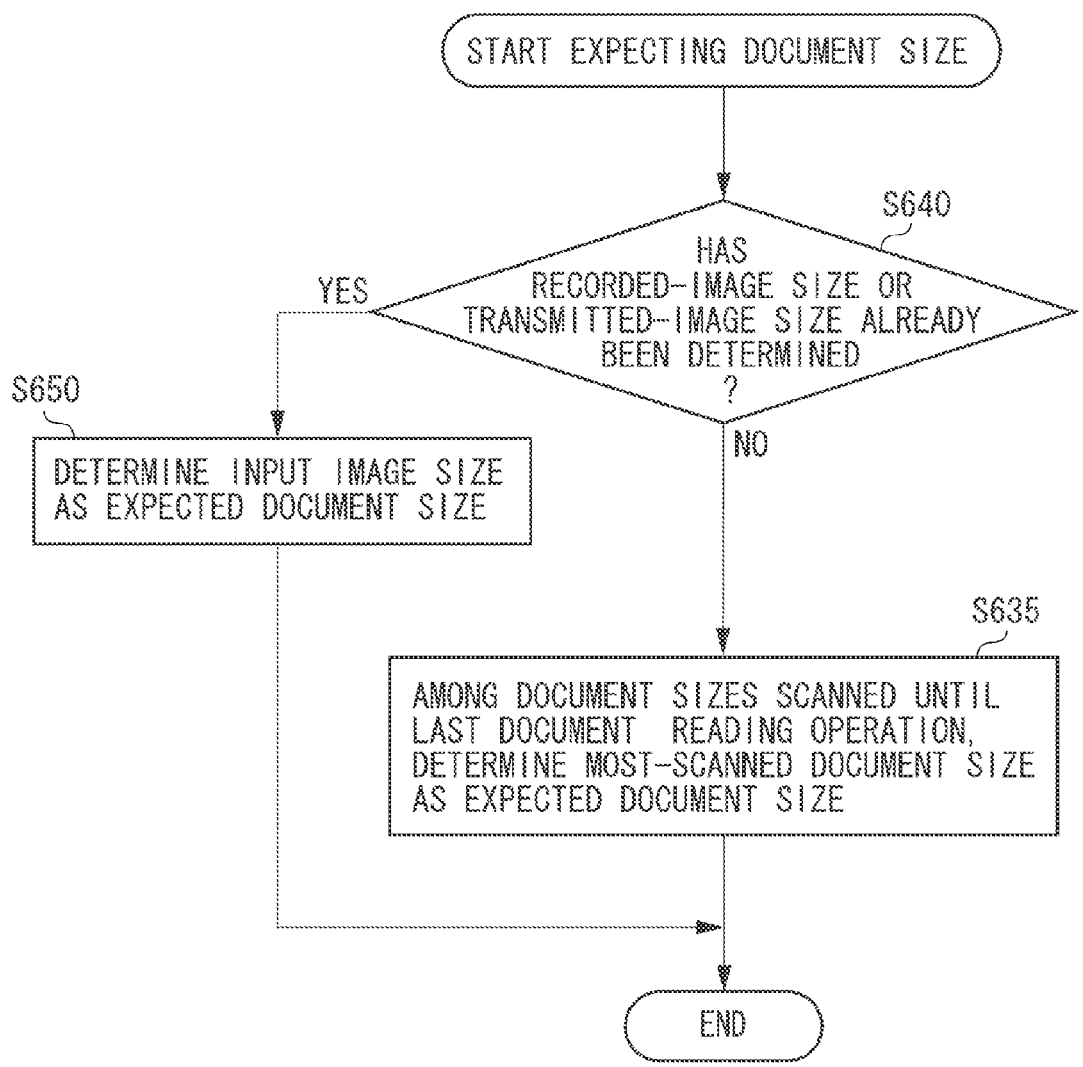
Figure 10:
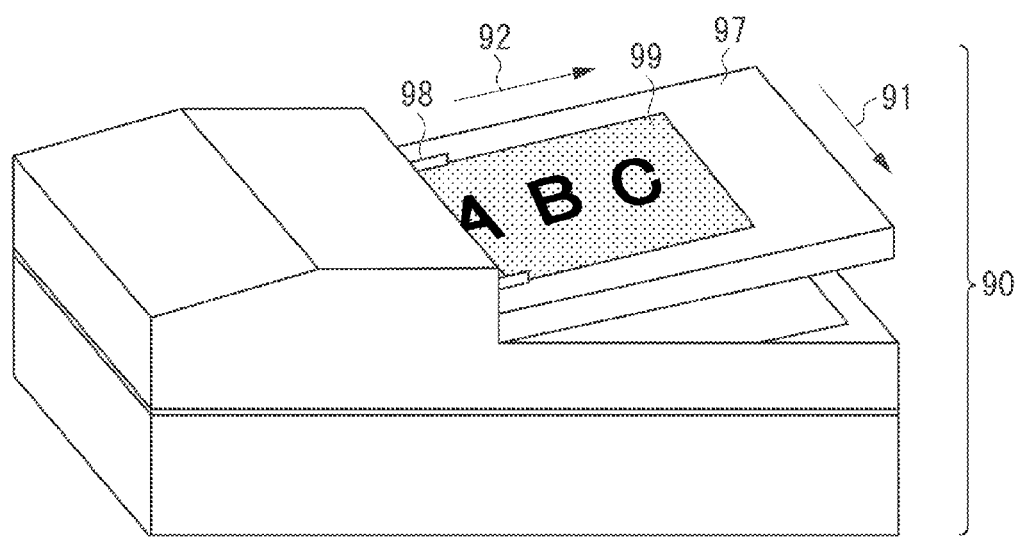
FIG. 10 illustrates an ADF of a scanner unit of an image forming apparatus.

FIG. 8B is a flow chart illustrating an expected document size determination procedure according to the eighth exemplary embodiment. The job control unit 4 executes this flow chart. More specifically, the CPU 10 executes this flow chart by executing a computer-readable program stored in a recording medium.

Steps S640 and S650 in FIG. 8B are the same as those in FIG. 8A, so that the redundant description thereof will be omitted.

In step S640 in FIG. 8B, if the job control unit 4 determines that no recorded-image size or transmitted-image size has been determined yet (NO in step S640), the processing proceeds to step S635.

In step S635, the job control unit 4 acquires the document sizes read and accumulated until the last document reading operation, and based on the accumulated document sizes, the job control unit 4 determines a most-read document size as an expected document size. Then, the processing proceeds to step S503 of the flow chart in FIG. 4.

Step S635 in FIG. 8B is the same as that in FIG. 7B.

As described above, according to the seventh and eighth exemplary embodiments, when the image forming apparatus executes a job that does not require printing, such as a scan job or a transmission job, if a recorded-image size or a transmitted-image size is determined, the job control unit 4 uses the determined image size to determine an expected document size. Thus, the image forming apparatus 300 requires a reduced number of sensors for determining a document size and can determine a document size before reading a document image (before feeding a document).

An expected document size determination procedure according to a ninth exemplary embodiment executed in step S502 in FIG. 4 will be described in detail with reference to a flow chart in FIG. 9.

FIG. 9 is a flow chart illustrating an expected document size determination procedure according to the ninth exemplary embodiment. The job control unit 4 executes this flow chart. More specifically, the CPU 10 executes this flow chart by executing a computer-readable program stored in a recording medium.

In step S670, the job control unit 4 determines what type of job is requested (job type determination processing). If the job control unit 4 determines that the job type is a copy job, that is, a job requiring printing (COPY JOB in step S670), the processing proceeds to step group S680.

Step group S680 includes any one of or a combination of the procedures in FIGS. 5A, 5B, 6A, 6B, 7A and 7B. Namely, step group S680 includes steps S610 and S620 and at least one of steps S630 to S635. Detailed description of these steps will be omitted.

For example, if a single expected document size cannot be determined by any one of steps S630 to S635, a plurality of steps among steps S630 to S635 may be combined. More specifically, a single expected document size cannot be determined if the largest number of sheet feed stages exists for a plurality of sheet sizes, if a plurality of sheet feed stages store the largest number of remaining print sheets, if the largest total number of remaining sheets exists for a plurality of sheet sizes, or if a plurality of most-scanned document sizes until the last scanning operation exist, for example.

On the other hand, in step S670, if the job control unit 4 determines that the job type is a scan job or a transmission job, that is, a job that does not require printing (SCAN JOB/TRANSMISSION JOB in step S670), the processing proceeds to step group S690.

Step group S690 includes the procedure in FIG. 8A or 8B. Namely, step group S690 includes steps S640 and S650, and step S634 or S635. Detailed description of these steps will be omitted.

In FIG. 9, if both of step groups S680 and S690 include step S634, one of the steps can be omitted. In addition, if both of step groups S680 and S690 include step S635, one of the steps can be omitted.

In the exemplary embodiments using the procedures in FIGS. 7A, 7B, 8A, 8B and 9, for example, the scanner control unit 3 stores information about the read document size after step S505 in FIG. 4 (or information about the determined document size) in a storage medium (the RAM 13 or the HDD 14).

In the exemplary embodiments using the procedures in FIGS. 5A to 9, the scanner control unit 3 can determine an expected document size, in view of the resolutions and magnification ratios used until the last reading operations. For example, if the reading conditions such as resolution and magnification ratio are the same as those used in one of the reading operations, the same document size may be determined as an expected document size.

As described above, according to any one of the exemplary embodiments, when determining a size of a document, the image forming apparatus does not use the document. Since the number of components for detecting a document size can be minimized, the size and cost of the image forming apparatus can be reduced.

In addition, by minimizing the number of document conveyance operations necessary for detecting the length of a document in the sub-scanning direction, reduction of productivity in image reading can be prevented.

The various data described above is not limited to the above configuration and contents. In addition, the data may have various different configurations or contents, depending on the applications or purposes.

Thus, while various exemplary embodiments have been described, the present invention can be realized as a system, an apparatus, a method, a program, or a storage medium, for example. More specifically, the present invention is applicable to a system configured by a plurality of devices or to an apparatus including a device. In addition, the present invention includes various combinations of the above exemplary embodiments.

An image forming apparatus according to the present invention can determine a size of a document without using the document while requiring a reduced number of sensors for determining the size of the document.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable storage medium may store a program that causes an image forming apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-178505 filed Aug. 17, 2011, which is hereby incorporated by reference herein in its entirety.

What is claimed is:

1. A document reading apparatus comprising:
   a document conveyance unit configured to convey a document;
   a reading unit configured to read the document conveyed by the document conveyance unit;
   a sheet storage unit configured to store a sheet;
   a first determination unit configured to determine a size of the document based on a size of the sheet stored in the sheet storage unit;
   a control unit configured to cause the document conveyance unit to convey the document and then cause the reading unit to read the document based on the size determined by the first determination unit;
   a second determination unit configured to determine a size of the document which is being conveyed by the document conveyance unit; and
   a third determination unit configured to determine whether the size determined by the first determination unit matches the size determined by the second determination unit,
   wherein, in a case where the third determination unit determines that the size determined by the first determination unit does not match the size determined by the second determination unit, the control unit causes the document conveyance unit to convey the document again and then causes the reading unit to read the document again based on the size determined by the second determination unit.

2. The document reading apparatus according to claim 1, wherein the sheet storage unit includes a plurality of sheet storage units, each of which is configured to store a sheet, wherein, in a case where a sheet storage unit is specified from among the plurality of sheet storage units, the first determination unit determines a size of a sheet stored in the specified sheet storage unit as the size of the document.

3. The document reading apparatus according to claim 1, wherein the sheet storage unit includes a plurality of sheet storage units, each of which is configured to store a sheet, and wherein the first determination unit determines a size of a sheet stored in a most-preferentially-selected sheet storage unit among the plurality of sheet storage units as the size of the document.

4. The document reading apparatus according to claim 1, wherein the sheet storage unit includes a plurality of sheet storage units, each of which is configured to store a sheet, and wherein the first determination unit determines a size of a sheet stored in a largest number of sheet storage units among the plurality of sheet storage units as the size of the document.

5. The document reading apparatus according to claim 1, wherein the sheet storage unit includes a plurality of sheet storage units, each of which is configured to store a sheet, and wherein, the first determination unit determines a size of a sheet stored in a sheet storage unit storing a largest number of remaining sheets among the plurality of sheet storage units as the size of the document.

6. The document reading apparatus according to claim 1, wherein the sheet storage unit includes a plurality of sheet storage units, each of which is configured to store a sheet, and wherein, the first determination unit determines a size of a sheet corresponding to a largest total number in size of remaining sheets in the plurality of sheet storage units as the size of the document.

7. The document reading apparatus according to claim 1, wherein, in a case where a job for performing printing is executed, the first determination unit determines the size of the document based on the size of the sheet stored in the sheet storage unit, and, in a case where a job for not performing printing is executed, the first determination unit determines the size of the document based on results of reading operations executed by the reading unit.

8. A document reading apparatus comprising:
   a document conveyance unit configured to convey a document;
   a reading unit configured to read the document conveyed by the document conveyance unit;
   a first determination unit configured to determine a size of the document based on results of reading operations executed by the reading unit;
   a control unit configured to cause the document conveyance unit to convey the document and then cause the reading unit to read the document based on the size determined by the first determination unit;
   a second determination unit configured to determine a size of the document which is being conveyed by the document conveyance unit; and
   a third determination unit configured to determine whether the size determined by the first determination unit matches the size determined by the second determination unit,
   wherein, in a case where the third determination unit determines that the size determined by the first determination unit does not match the size determined by the second determination unit, the control unit causes the document conveyance unit to convey the document again and then causes the reading unit to read the document again based on the size determined by the second determination unit.

9. The document reading apparatus according to claim 8, further comprising a storage unit configured to store sizes determined by the second determination unit as results of reading operations executed by the reading unit, wherein the first determination unit determines a size last stored in the storage unit as the size of the document.

10. The document reading apparatus according to claim 8, further comprising a storage unit configured to accumulate sizes determined by the second determination unit as results of reading operations executed by the reading unit, wherein the first determination unit determines a size most frequently accumulated in the storage unit as the size of the document.

11. A method of controlling a document reading apparatus that includes a document conveyance unit configured to convey a document, a reading unit configured to read the document conveyed by the document conveyance unit, a sheet storage unit configured to store a sheet, and a determination unit configured to determine a size of the document which is being conveyed by the document conveyance unit, the method comprising:
   determining a size of the document based on a size of the sheet stored in the sheet storage unit;
   causing the document conveyance unit to convey the document and then causing the reading unit to read the document based on the size determined based on the size of the sheet stored in the sheet storage unit;

determining whether the size determined based on the size of the sheet stored in the sheet storage unit matches the size determined by the determination unit; and causing, in a case where it is determined that the size determined based on the size of the sheet stored in the sheet storage unit does not match the size determined by the determination unit, the document conveyance unit to convey the document again and then causing the reading unit to read the document again based on the size determined by the determination unit.

12. A method of controlling a document reading apparatus that includes a document conveyance unit configured to convey a document, a reading unit configured to read the document conveyed by the document conveyance unit, and a determination unit configured to determine a size of the document which is being conveyed by the document conveyance unit, the method comprising:

determining a size of the document based on results of reading operations executed by the reading unit;

causing the document conveyance unit to convey the document and then causing the reading unit to read the document based on the size determined based on results of reading operations executed by the reading unit;

determining whether the size determined based on results of reading operations executed by the reading unit matches the size determined by the determination unit; and causing, in a case where it is determined that the size determined based on results of reading operations executed by the reading unit does not match the size determined by the determination unit, the document conveyance unit to convey the document again and then causing the reading unit to read the document again based on the size determined by the determination unit.

13. A non-transitory computer-readable storage medium storing a program causing a document reading apparatus to perform the method according to claim 11.

14. A non-transitory computer-readable storage medium storing a program causing a document reading apparatus to perform the method according to claim 12.

15. The document reading apparatus according to claim 1, further comprising a receiving unit configured to receive a size of the document from a user, wherein, in a case where the receiving unit receives the size of the document, the reading unit reads the document based on the size received by the receiving unit, and wherein, in a case where the receiving unit does not receive the size of the document, the first determination unit determines the size of the document based on the size of the sheet stored in the sheet storage unit, and the control unit causes the document conveyance unit to convey the document and then causes the reading unit to read the document based on the size determined by the first determination unit.

16. The document reading apparatus according to claim 1, further comprising a prompting unit configured to prompt a user to set the document, in a case where the third determination unit determines that the size determined by the first determination unit does not match the size determined by the second determination unit.

17. The document reading apparatus according to claim 16, wherein, after the prompting unit prompts the user to set the document and then the document is set by the user, the control unit causes the document conveyance unit to convey the document again and then causes the reading unit to read the document again based on the size determined by the second determination unit.

18. A document reading apparatus comprising:

a document conveyance unit configured to convey a document;

a reading unit configured to read the document conveyed by the document conveyance unit;

a sheet storage unit configured to store a sheet;

a control unit configured to cause the document conveyance unit to convey the document and then cause the reading unit to read the document based on a size of the sheet stored in the sheet storage unit; and a determination unit configured to determine whether the size of the sheet stored in the sheet storage unit matches a size of the document which is being conveyed by the document conveyance unit, wherein, in a case where the determination unit determined that the size of the document which is being conveyed by the document conveyance unit does not match the size of the sheet stored in the sheet storage unit, the control unit causes the document conveyance unit to convey the document again and then causes the reading unit to read the document again based on the size of the document which is being conveyed by the document conveyance unit.

* * * * *